Patented Dec. 1, 1953

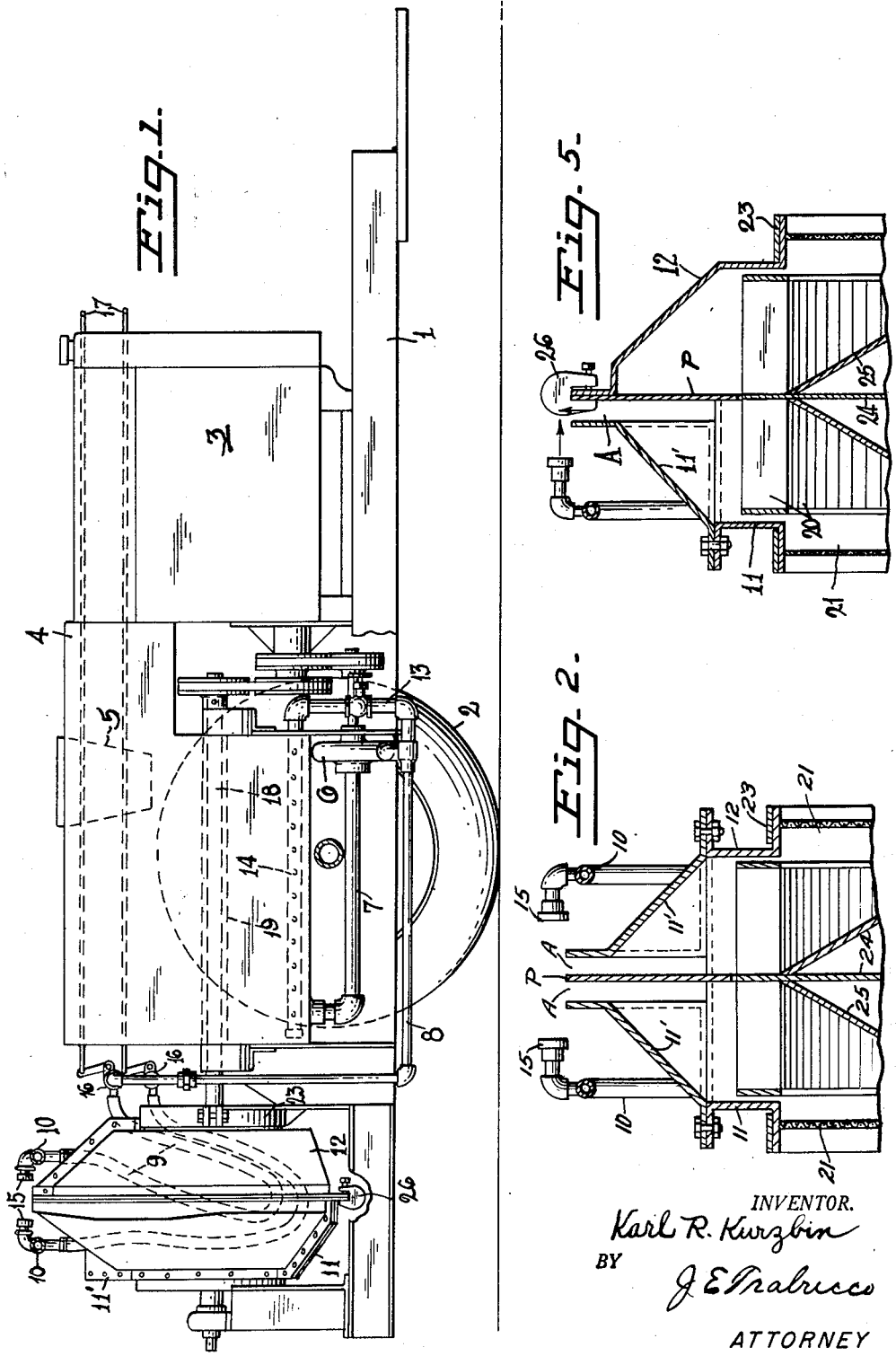

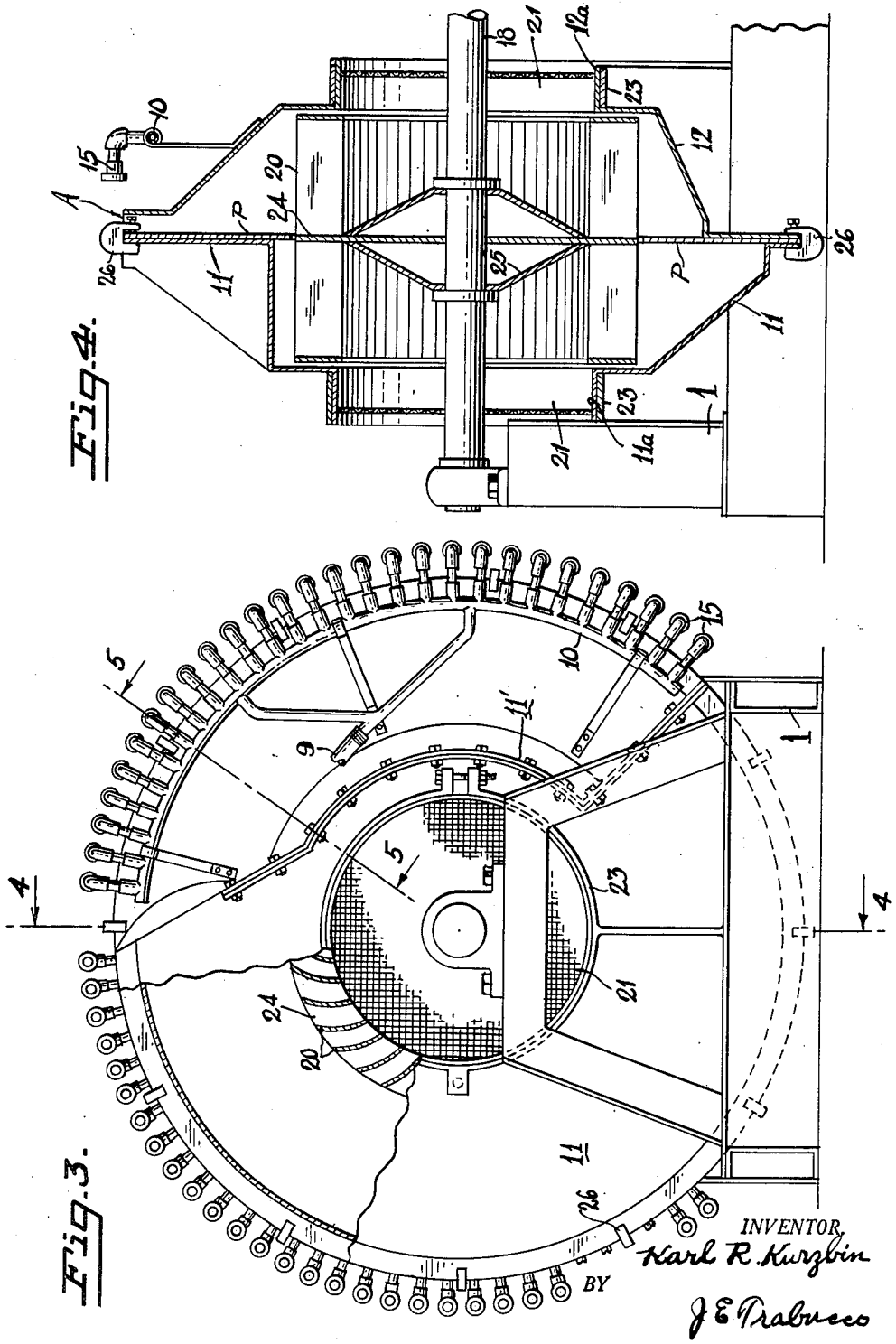

2,661,242

UNITED STATES PATENT OFFICE 2,661,242

SPRAYING MACHINE

Karl R. Kurzbin, San Jose, Calif., assignor, by mesne assignments, to Robert W. Ryder Application January 27, 1948, Serial No. 4,583

6 Claims. (Cl. 299—86)

This invention relates to improvements in spraying machines.

An object of my invention is to provide an improved spraying machine having an air outlet nozzle which may be adjusted as to size and position to cause a suitable spray to be discharged where it is most needed.

Another object of my invention is to provide an improved spraying machine having two relatively adjustable fan housings carrying opposed rows of peripheral liquid ejectors which are arranged to direct liquid sprays into an air stream discharged through an adjustable nozzle opening formed between the fan housings.

Other objects and advantages of my invention will be pointed out hereinafter, or will be indicated in the appended claims or will be obvious to one skilled in the art upon an understanding of the present disclosure. For the purpose of this application I have elected to show herein certain forms and details of a spraying machine representative of my invention; it is to be understood however that the embodiment of my invention herein shown and described is for purposes of illustration only, and that therefore it is not to be regarded as exhaustive of the variations of the invention.

In the accompanying drawings:

Fig. 1 is a side elevation of my spraying machine, showing parts broken away and in section for a better understanding of the invention;

Fig. 2 is a fragmentary sectional view showing the position of the fan housing members when the nozzle openings thereof are arranged in adjacent opposed relation;

Fig. 3 is an enlarged front view of the machine, showing parts broken away and in section;

Fig. 4 is a vertical sectional view taken on the line 4—4 of Fig. 3; and

Fig. 5 is a sectional view taken on the line 5—5 of Fig. 3.

Referring to the drawings the numeral 1 designates a suitable frame which is preferably mounted on wheels 2 for convenience in transporting the machine from place to place and for positioning it in desirable operating locations. The machine's power plant, which may be a gasoline engine, is indicated generally at 3. A liquid supply tank 4 for holding quantities of a chemical solution or liquid spray material is mounted on the frame in a position in front of the power plant. A filling opening at the upper side of the tank 4 is provided with a strainer 5.

The power plant 3 is operatively connected in the usual manner to a liquid pump 6, the inlet side of which is connected by a line 7 to the bottom side of the tank. The outlet side of the pump is connected by a line 8 to flexible conduits 9, which in turn are connected to semi-circular manifolds 10 rigidly secured on two similarly constructed opposed fan housing members 11 and 12 as by brackets. The outlet side of the pump is also connected by a line 13 to a horizontal perforated pipe 14 which is mounted inside the tank near the bottom of the latter. A small portion of the liquid spray material withdrawn from the tank is discharged through the perforations in the pipe 14 to agitate the main body of the spray material in the tank and prevent the settling of the solid particles thereof.

Connected to and supported on each of the manifolds 10 are a plurality of spaced ejectors 15 which are arranged in arcuate formation and are positioned to discharge jets of the liquid spray material into an air stream issuing from arcuate nozzle openings located at the peripheries of the fan housing members 11 and 12. Control valves 16 associated with each of the flexible conduits 9 are connected by cables 17 to suitable conveniently located operating levers (not shown), the said control valves serving to selectively regulate the spray material discharged by each battery of ejectors 15.

Operatively connected to the power plant 3 is a drive shaft 18 which passes through a tube 19 extending through the tank 4. The drive shaft is supported in a horizontal position in suitable bearings secured on the frame 1. Secured to the shaft 18 and positioned inside the fan housing members 11 and 12 is a centrifugal fan comprising a number of circularly arranged fan blades 20 which are so constructed and arranged as to draw air into the fan housing through axial screened openings 21 and discharge it outwardly through the arcuate nozzle openings A. The fan housing members 11 and 12 are formed, respectively, with circular hub flanges 11a and 12a which are supported by bands 23 secured to the frame 1. The bands 23 are normally secured in clamped positions around the hub flanges 11a and 12a, as by bolt and nut means, thereby preventing the rotation of the fan housing members 11 and 12 when the fan blades are rotated. Either fan housing member may be rotatively adjusted by unloosening its associated band and the means which fastens the said housing members together.

The fan blades 20 are secured to and supported by a disc member 24 which is rigidly fastened to the drive shaft 18. In order to deflect the incoming air radially into engagement with the fan blades 20, cones 25 are axially arranged with their larger ends abutting the disc member 24.

Interposed between the fan housing members 11 and 12 is a stationary ring shaped partition plate P which divides that part of the interior of the said housing members which is located outwardly from the fan blades 20 into two enclosed areas or compartments, each of which has a similarly shaped peripheral arcuate outlet or nozzle opening A for the discharge of air. The fan housing members 11 and 12 together with the partition plate P are secured together at their peripheries as by U-shaped or C-clamps 26, and each housing member in combination with the common partition plate P forms an enclosure for controlling the air discharged outwardly by the fan blades 20. Each of the fan housing members 11 and 12 is provided with a similarly shaped deflector plate 11', which in combination with the common partition plate P, forms the sides of the arcuate peripheral opening or nozzle A for the discharge of air. The two nozzle openings A are adapted to be adjusted as to combined length and combined width by the rotative adjustment of the housing members 11 and 12. It is to be understood that the fan housing members may be suitably shaped to provide peripheral arcuate openings without the necessity of employing the deflector plates. The ejectors 15 are arranged in laterally spaced relationship to the nozzle openings A, thereby making it possible for the air stream discharged from the nozzle openings to atomize the liquid material injected into it by the said ejectors. The fan blades 20 are designed to discharge the air through the nozzle openings A with considerable velocity, and since the ejectors 15 are arranged to eject the liquid spray material at substantially right angles to and directly into the air stream as it leaves the nozzle openings, there is created a fog-like spray which extends outwardly over an arc controlled by the length of the nozzle opening or openings.

It will be noted that by detaching the U-shaped clamps 26 from the peripheries of the fan housing members 11 and 12, either of the latter may thereupon be rotatably adjusted upon unloosening its associated band 23. Since the outer arcuate edge of each deflector plate 11′ extends through an arc of about a third of a circle, the combined length of the nozzle openings may vary from roughly two thirds of a circle to one third, depending upon the relative adjustment of the fan housing members. When the fan housing members 11 and 12 are positioned so their respectively associated deflector plates are in directly opposed relation the nozzle openings A will have a combined maximum width, but the length will be shorter than when the said plates are in other relative positions. The volume of air then discharged through the wider but shorter combined nozzle openings will be considerably increased with respect to the volume ordinarily discharged through the same length opening when the over all or combined length of the said nozzle openings is longer and its width is less, as when the deflector plates are not in opposed relation. The volume of air displaced by the fan blades 20 remains constant irrespective of the relative positions of the nozzle openings A, and similarly the volume of air discharged through each nozzle opening is substantially the same irrespective of its relative position with respect to the other of said openings.

However, by the adjustment of the fan housing members 11 and 12 so the combined width of the nozzle openings is double that of a single nozzle opening, a maximum volume of air within the capacity of the fan may be directed through the shorter but wider combined nozzle openings. Thus when a maximum volume of air is to be concentrated into a small area, the nozzle openings A will be arranged in corresponding side-by-side positions. It is also to be noted that the nozzle openings A may be adjusted so as to direct a spray toward the ground and also upwardly to reach the branches of nearby trees. The amount of the liquid spray material entering the air stream may be conveniently regulated in accordance with different requirements by adjusting the valves 16.

It will be noted that the fan housing members 11 and 12 being substantially frustro-conical in shape, are designed and arranged so that the air discharged by the fan blades 20 is conducted to the nozzle openings A without any appreciable loss in velocity. The fan housing of the present invention functions quite differently from the ordinary fan housings now in use in that the latter materially reduce the high impellor velocity of the discharged air in order to prevent high friction losses in the ducts or piping. The present invention primarily by reason of the novel shape of the fan housing, is capable of operating with the expenditure of far less mechanical energy than is possible with spraying machines of the kind now commonly used.

What I claim is:

1. A spraying machine comprising two concave fan housing members forming a fan housing, the said housing members each having an arcuate peripheral air discharge opening of less than one hundred and eighty degrees in length, and the said housing members being independently rotatingly adjustable to permit the relative change of position of the discharge openings, a fan operatively positioned in the housing for discharging air in a continuous stream through the discharge openings, and a plurality of liquid spray ejectors secured to each housing in laterally spaced relation to the peripheral air discharge opening thereof, the said ejectors being constructed and arranged to discharge liquid material into the air discharged from the said opening.

2. A spraying machine comprising a fan housing having two independently rotatively adjustable concave housing members arranged in opposed relation and each having an arcuate peripheral air discharge opening, the said housing members having axial air inlet openings, a partition arranged between the housing members, a centrifugal fan operatively mounted in the housing, and a plurality of spaced liquid ejectors carried by each fan housing and arranged in laterally spaced relation to the air discharge opening thereof, the said ejectors of each housing being constructed and arranged to discharge a liquid spray material into the air discharged from an associated air discharge opening.

3. A spraying machine comprising a fan housing having two independently rotatively adjustable concave housing members arranged in opposed relation and each having an arcuate peripheral air discharge opening and an axial air inlet opening, the said housing members being independently rotatively relatively adjustable to arrange the air discharge openings in different relative positions, a centrifugal fan operatively mounted in the fan housing, and a plurality of liquid ejectors carried by each housing member and rotatively adjustable therewith and arranged to discharge a liquid spray into the air stream issuing from the peripheral opening of its associated housing member, the ejectors of each housing member being laterally spaced from the air discharge opening of the housing member on which they are carried.

4. A spraying machine comprising a rotatively adjustable fan housing having opposed concave housing members arranged for independent rotative adjustment, each housing member having an axial air inlet opening and an arcuate peripheral air outlet opening of less than one hundred and eighty degrees in length, the said housing members being independently adjustable to position their outlet openings in substantial arcuate alignment or in registry to provide a single wide arcuate opening, and a plurality of arcuately arranged ejectors carried by each fan housing member and positioned in laterally spaced relation to the air outlet thereof, the said nozzles of each member being arranged to discharge jets of liquid spray into the air stream issuing from the peripheral opening of its associated housing member.

5. A spraying machine comprising a drive shaft, a plurality of circularly arranged fan blades keyed to the shaft, a fan housing enclosing the fan blades, the said fan housing comprising two independently rotatively adjustable opposed concave fan housing members, means detachably fastening the housing members together, each housing member having an arcuate peripheral air outlet opening of less than one hundred and eighty degrees in length and an air inlet opening, a curved liquid manifold carried by each housing member, means for supplying a liquid spray material under pressure to the manifolds, and a row of spaced ejectors connected to and carried by each manifold, the said ejectors of each row being arranged in laterally spaced relation to the outlet opening of its associated housing member, and the said ejectors of each row being positioned to direct jets of liquid spray material into the air stream issuing from the outlet opening of its associated housing member.

6. A spraying machine comprising a drive shaft, a plurality of circularly arranged fan blades secured to the shaft, a fan housing enclosing the fan blades, the said fan housing having two independently adjustable concave housing members normally secured together, each housing member having an arcuate peripheral air outlet opening of less than one hundred and eighty degrees in length and an axial inlet opening, a liquid manifold secured to each housing member, a row of spaced ejectors connected to and carried by each manifold and arranged in laterally spaced relation to the arcuate air outlet opening of its associated housing member, the ejectors of each row being arranged to direct jets of liquid spray material into the air stream issuing from the outlet opening of its associated housing member, a supply reservoir for the liquid spray material connected to the manifolds, pump means for withdrawing the liquid spray material from the reservoir and supplying it under pressure to the manifolds, and means associated with each manifold for controlling the amount of spray material supplied thereto.

KARL R. KURZBIN.

References Cited in the file of this patent

UNITED STATES PATENTS

| Number | Name | Date |
|---|---|---|
| 174,813 | Hargreaves | Mar. 14, 1876 |
| 902,605 | Reeve | Nov. 3, 1908 |
| 1,303,207 | Kelley et al. | May 6, 1919 |
| 1,728,204 | Falla | Sept. 17, 1929 |
| 1,936,311 | Schramm | Nov. 21, 1933 |
| 2,116,539 | Payne et al. | May 10, 1938 |
| 2,188,741 | Roberts | Jan. 30, 1940 |
| 2,238,120 | Launder | Apr. 15, 1941 |
| 2,358,318 | Daugherty | Sept. 19, 1944 |
| 2,374,955 | Raper | May 1, 1945 |
| 2,429,374 | Shade | Oct. 21, 1947 |

FOREIGN PATENTS

| Number | Country | Date |
|---|---|---|
| 122,941 | Great Britain | Feb. 13, 1921 |
| 140,664 | Great Britain | Apr. 1, 1920 |